June 14, 1927.
K. SCHMIDT
SPEED REGULATOR
Filed Jan. 5, 1926
1,632,565
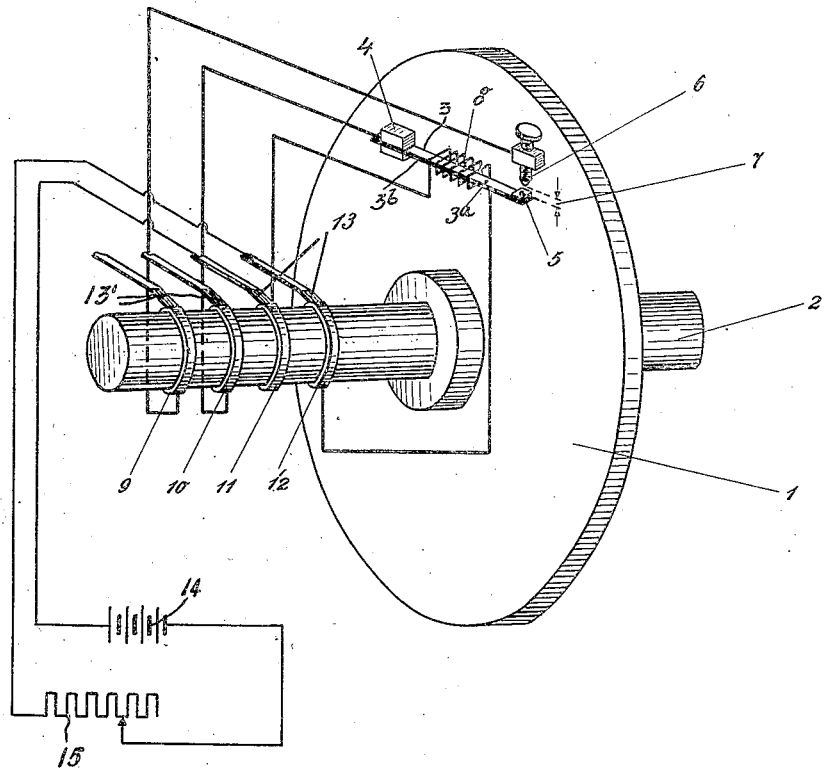
Inventor:-
Karl Schmidt
by [signature]
attorney Patented June 14, 1927.

1,632,565

UNITED STATES PATENT OFFICE.

KARL SCHMIDT, OF LICHTENRADE, NEAR BERLIN, GERMANY, ASSIGNOR TO C. LORENZ-AKTIENGESELLSCHAFT, OF BERLIN-TEMPELHOF, GERMANY.

SPEED REGULATOR.

Application filed January 5, 1926, Serial No. 79,364, and in Germany March 24, 1925.

This invention has reference to speed regulators for maintaining rotating bodies and more particularly electric machines at a constant speed of the type forming the subject of my copending application Ser. No. 686,432 and comprising two co-operating contacts mounted on a rotating member, adapted under the combined action of gravity and centrifugal force, to be opened and closed once in each revolution, the period of reclosure varying according to the speed. Resistance inserted into the shunt-circuit of an electric prime mover may be thereby short-circuited and the speed maintained within 1/1000 per cent of a constant value determined in advance by the distance at which the contacts are adjusted.

When operating such a regulator deviations from the normal speed may be observed due to variations of the temperature of the spring bearing the oscillating contact and it is the object of the present invention to obviate this disadvantage and to provide means whereby the normal speed may be varied within slight limits.

According to this invention these ends are attained by the application of heat to the member supporting the movable contact, thereby controlling its temperature independently of external influences.

The invention also results in the further advantage that the regulator may be shut in on all sides, this hitherto not having been feasible because of the necessity of exposing the contacts freely to the atmosphere in order to maintain the support of the movable contact at an even temperature. In a regulator according to the present invention it is possible to bring the temperature of the spring at the beginning to a value corresponding to that existing at full speed and afterwards when the machine is running and the temperature tends to rise to reduce the rate of heat supply and thereby maintain the temperature at a constant value.

In order that the invention may be clearly understood and readily carried into effect, it will be more fully described with reference to the accompanying drawing which shows one means of performing it.

In the form of the invention illustrated a disc or the like 1 is fitted to the shaft 2 the speed of which is to be regulated, a spring 3 being fixed to the disc by a clamp or the like 4 and carrying a contact 5 of appreciable weight adapted to co-operate with a contact 6 carried by the disc 1. In the position of the disc illustrated the force on the weight 5 due to gravity counteracts the centrifugal force, whereas after a revolution of 180° the two forces act in like direction. When suitably dimensioned it may be ensured, that, once each revolution when the contact weight 5 comes within the neighborhood of its lowest position, contact takes place.

According to the invention the spring 3 is surrounded by a heating coil 8, the current in which from a source 14, supplied by means of sliprings 11 and 12 and brushes 13, may be regulated by a rheostat 15. Hence the temperature of the spring and its elastic properties are altered and the speed changes accordingly. Another way of varying the speed consists in making the spring of two different metal layers 3ª—3ᵇ the thermal coefficient of expansion of which must be different whereby, in a manner similar to that common in thermostats, the spring is bent with change of temperature and the distance of the contacts varied. Slip-rings 9 and 10 and brushes 13' are provided for connecting the contacts to the regulating device of the driving motor.

What I claim is:—

1. In a speed regulator of the character described, in combination, a rotating member, a contact fixed thereon, a co-operating oscillating contact arranged upon a resilient support also mounted on said rotating member and adapted to close said two mentioned contacts influencing a speed-controlling means intermittently once during each revolution by the joint co-operation of centrifugal force and gravity acting upon said oscillating contact, and means whereby the temperature of the contact-bearing members may be regulated.

2. In a speed regulator of the character described, in combination, a rotating member, a contact fixed thereon, a co-operating oscillating contact arranged upon a resilient support also mounted on said rotating member and adapted to close said two mentioned contacts influencing speed-controlling means intermittently once during each revolution by the joint co-operation of centrifugal force and gravity acting upon said oscillating contact, an electric heating coil influencing a contact-bearing member, and means for applying to said heating coil a variable current during the rotation of the device.

3. In a speed regulator of the character described, in combination, a rotating member, a contact fixed thereon, a co-operating oscillating contact arranged upon a resilient support also mounted on said rotating member and adapted to close said two mentioned contacts influencing a speed-controlling means intermittently once during each revolution by the joint co-operation of centrifugal force and gravity acting upon said oscillating contact, an electric heating coil surrounding said resilient support of said oscillating contact, and means for applying to said heating coil a variable current during the rotation of the device.

4. In a speed regulator of the character described, in combination, a rotating member, a contact fixed thereon, a co-operating oscillating contact arranged upon a resilient support consisting of two different metals of different thermal coefficient of expansion, mounted also on said rotating member and being adapted to close said two mentioned contacts influencing a speed-controlling means intermittently once during each revolution by the joint cooperation of centrifugal force and gravity acting upon said oscillating contact, an electric heating coil surrounding said resilient support of said oscillating contact, and means for applying to said heating coil a variable current during the rotation of the device.

5. In a speed regulator of the character described, a rotating member, speed controlling contacts mounted thereon and operable for a speed controlling action under centrifugal force and gravity at least once on each rotation of the rotary member, and means for thermally regulating the responsiveness of the contacts.

6. In a speed regulator of the character described, a rotating member, speed controlling contacts mounted thereon and operable for a speed controlling action under centrifugal force and gravity at least once on each rotation of the rotary member, and means for thermally influencing one of the contacts and thereby regulating the responsiveness of the contacts.

In testimony whereof I have affixed my signature.

KARL SCHMIDT.